March 24, 1925.                                                           1,530,820
W. W. EVANS ET AL
GOLF BALL CORE AND METHOD OF MAKING THE SAME
Filed April 6, 1921

Colloidal suspension of powdered lead in liquefied glue-glycerine mixture

Vulcanized rubber

Inventors
W. W. Evans
B. Dales
W. H. Juve
E. H. Junkins
By Robert M. Pierson
Atty.

Patented Mar. 24, 1925.

1,530,820

UNITED STATES PATENT OFFICE.

WALTER W. EVANS, BENTON DALES, WALTER H. JUVE, AND EMMET H. JUNKINS, OF AKRON, OHIO, ASSIGNORS TO THE B. F. GOODRICH COMPANY, OF NEW YORK, N. Y., A CORPORATION OF NEW YORK.

GOLF-BALL CORE AND METHOD OF MAKING THE SAME.

Application filed April 6, 1921. Serial No. 459,091.

*To all whom it may concern:*

Be it known that we, WALTER W. EVANS, BENTON DALES, WALTER H. JUVE, and EMMET H. JUNKINS, citizens of the United States, residing at Akron, in the county of Summit and State of Ohio, have invented a certain new and useful Golf-Ball Core and Method of Making the Same, of which the following is a specification.

This invention relates to the construction and manufacture of golf-balls, and more particularly the part known as the core, on which the rubber thread or tape is wound under tension. It is well known that core materials having high mobility, such as liquids, when combined with a tight winding, will afford the longest flight, especially when the core is weighted to make a heavy ball of relatively small size; but difficulties have been encountered in properly confining the liquid to prevent its penetration into the winding, in securing uniformity of weight and size, and in providing a suitable liquid and envelope therefore, and a type and location of weighting material, such that the center of gravity will be at the center of the ball, and the core material will not solidify or possess toxic or injurious properties.

Our invention is directed to overcoming these difficulties and securing in a high degree the above-mentioned desirable qualities in a golf-ball, together with added convenience in the manipulation of the core materials and decreased cost of manufacture.

In a preferred mode of practicing the invention we effect a permanent suspension of a weighting substance such as finely-divided metallic lead in a gelatinous material such as glue or gelatine, to which glycerine is added to control the setting of the mixture to a gel, then cast or mold this plastic or fluid material in a suitable form to make a core member which on setting can be handled as a dough pellet, cover this core member with hemispherical cups of raw rubber, and vulcanize the rubber in a spherical mold. The mixing of the materials may be facilitated by moderately heating them, without preventing them from setting to a gel upon cooling, although longer or more intense heating causes the mixture to become permanently liquid, losing its gelatinizing property. In mixing the materials they are heated only long enough and only to such temperature as to produce an even mixture, without changing the glue into products which do not have the property of setting. It is found that the relatively high heat of vulcanization, on the other hand, does effect such change in the mass, and thus permanently liquefies the mixture within the rubber envelope, but the liquid remains sufficiently viscous to retain the powdered lead uniformly distributed throughout its mass in what may be described as a condition of calloidal suspension. The tense windings of rubber tape or thread are then applied and the ball is provided with its outer cover in the usual manner.

Fig. 1 of the accompanying drawings is a sectional view illustrating the solidified core-pellet or inner member.

Figure 1:
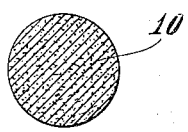
Figure 2:
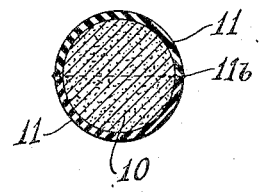
Fig. 2 is a similar view showing the same covered with the unvulcanized rubber capping stock.

In the drawings, 10 is the core pellet, which may be molded in spherical form as shown, although its exact shape at this stage is unimportant since it is of dough-like consistency and the subsequent manipulations can be made to bring it into spherical shape. For this element we prefer to use a substance of the nature of glue-glycerine compound and mix therewith a weighting substance such as powdered metallic lead, although we do not exclude the use of other vehicles or other metals or metallic oxides or salts. The ultimate viscosity of the carrier or vehicle, and the fineness of the weighting substance, should be such that said weighting substance remains permanently or colloidally suspended in the vehicle, and the respective materials should also be of such nature as not to form setting compounds when once enclosed in their envelope and reduced to a fluid condition as hereinafter described. Suitable powdered lead may be obtained by known spraying methods, of a degree of fineness to pass through a screen of 200 to 300 meshes per linear inch. By way of example, materials may be taken by weight as follows:—200 parts of glue, 140 parts of water, 126 parts of glycerine, 1000 parts of disintegrated lead. This compound has a specific gravity of 2.93, but obviously the gravity may be changed as desired by varying the proportion of lead, and the relative quantities of the other materials may also be varied more or less. A paste is made by swelling or dissolving the glue in the water, adding the glycerine, preferably with the aid of some heat, and then adding the required amount of powdered lead, which is thoroughly distributed by stirring into the mixture. The lead is conventionally represented by stippling in the drawings. While this mixture is still runny it is poured into suitable molding forms and allowed to jell or set, the result being, for example, a spherical pellet of which a cross-section is shown in Fig. 1. This inner core member is then covered with a pair of cup-shaped pieces of vulcanizable rubber capping stock 11, 11, whose edges are squeezed together to make a seam 11ᵇ as indicated in Fig. 2.

Figure 3:
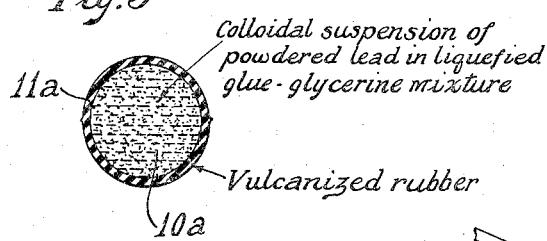
Fig. 3 is a sectional view showing the vulcanized rubber envelope containing the liquefied, weighted core material.

This raw core is then vulcanized between the halves of a mold having a spherical cavity, by the application of heat, with the result indicated in Fig. 3, the inner core material being here designated as 10ᵃ and the cover as 11ᵃ. The heat of vulcanization reduces the glue-glycerine paste or gel to a fluid state by the liquefaction of the glue, the presence of the glycerine contributing to this result and also serving the purpose of lowering the setting or "freezing" point of the mixture so that the core will not objectionably stiffen in cold weather. This liquid is sufficiently viscous to retain the finely-divided weighting material uniformly in suspension throughout its mass.

Figure 4:
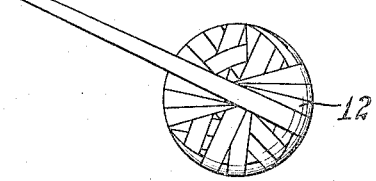
Fig. 4 is a side elevation of the partially wound ball.
Figure 5:
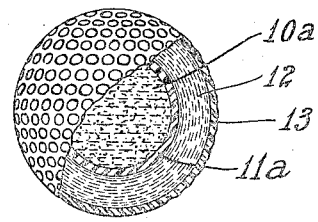
Fig. 5 is a side elevation, partly in section, showing the complete ball.

The core is now ready for the winding of tense rubber tape or thread 12 (Figs. 4 and 5), followed by the application of a wearing cover 13 of gutta-percha or a mixture thereof with rubber or other material, these elements being applied in the usual or any suitable manner.

Owing to the fact that neither glue nor glycerine will attack rubber, the envelope 11ᵃ can be formed with a perfect vulcanized seam without the interposition of any lining or inner envelope between the rubber container and the liquid, and the latter is prevented from escaping into the windings and thereby decreasing the tension on said windings, as often occurs in balls which employ as a liquid container a thin, vulcanized, rubber bag or sack tied at the neck. The latter has the further disadvantage that the tied bag mouth or knot impairs the sphericity of the core and introduces aberrations both in flight and in running on the ground. Our new weighted core material possesses a relatively high specific gravity, so that all of the weighting may be done in the central mass and no metal need be placed in the other components such as the rubber envelope or container, as has often been the practice heretofore because the necessary weight could not be put into the liquid vehicles previously used. The envelope 11ᵃ, like the rubber thread windings 12, may now be made of pure-gum stock, or stock having little or no mineral filler, thus adding to its resiliency and minimizing the errors due to unavoidable variations in the gauge or thickness of the sheet-rubber capping stock. The result is a greater degree of uniformity in balls made to the same specifications, in addition to the advantages already indicated.

We claim:

1. A golf-ball core comprising an envelope containing powdered metallic lead distributed throughout a liquid of such high viscosity as to maintain said lead in colloidal suspension.

2. A golf-ball core including a weighting substance suspended in a liquefied gelatinous material.

3. A golf-ball core including a weighting material suspended in liquid glue.

4. A golf-ball core including a weighting material suspended in a glue-glycerine mixture.

5. A golf-ball core including powdered lead suspended in a liquefied glue-glycerine mixture.

6. A golf-ball core comprising a liquid-tight, imperforate hollow sphere of vulcanized rubber containing in direct contact therewith a viscous liquid having a finely-divided solid weighting substance uniformly suspended throughout its mass.

7. A golf-ball core comprising an impervious envelope of vulcanized rubber containing powdered lead suspended in a fluid glue-glycerine mixture.

8. A golf-ball comprising a core composed of an impervious vulcanized rubber container and a mixture therein of lead powder uniformly suspended in liquid glue-glycerine, a tense winding of rubber thread and an outer cover.

9. A composition of matter comprising a gelatinous substance permanently liquable by heat when out of contact with air, and adapted for contacting enclosure in rubber, and having finely divided solid weighting material suspended throughout its mass.

10. A composition of matter comprising glue-glycerine compound having powdered lead uniformly distributed throughout its mass.

11. The method of making golf-ball cores which comprises effecting a mixture of a mobile substance with a weighting material, enclosing a body of said mixture in an envelope, and thereafter permanently increasing the fluidity of said mixture in the envelope.

12. The method of making golf-ball cores which comprises effecting a mixture of a weighting material with a heat-liquable substance, enclosing a pellet of said mixture in a vulcanizable rubber envelope, and applying heat to vulcanize said envelope and liquefy the pellet therein.

13. The method of making golf-ball cores which comprises mixing powdered metal with a heat-liquable substance and allowing the substance to set to a plastic condition, enclosing a body of the weighted plastic in a vulcanizable rubber envelope, and vulcanizing said envelope by the application of heat.

14. The method of making golf-ball cores which comprises enclosing a solid pellet of glue-glycerine mixture in a vulcanizable rubber envelope, and applying heat to vulcanize the envelope and liquefy the enclosed mixture.

15. The method of making golf-ball cores which comprises mixing a finely-divided weighting substance with glue and glycerine, enclosing a pellet of the mixture in a vulcanizable rubber envelope, and applying heat to vulcanize the envelope and liquefy the contained mixture.

16. The method of making golf-ball cores which comprises mixing powdered lead with glue and glycerine, molding the mixture into a pellet and allowing it to set, covering the pellet with an envelope of vulcanizable rubber, and applying heat to vulcanize the envelope and liquefy the contained mixture.

In witness whereof we have hereunto set our hands this 1st day of April, 1921.

WALTER W. EVANS.
BENTON DALES.
WALTER H. JUVE.
EMMET H. JUNKINS.